US011148190B2

(12) United States Patent
Propheter-Hinckley

(10) Patent No.: US 11,148,190 B2
(45) Date of Patent: Oct. 19, 2021

(54) RIB BUMPER SYSTEM

(71) Applicant: United Technologies Corporation, Farmington, CT (US)

(72) Inventor: Tracy A. Propheter-Hinckley, Rocky Hill, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 404 days.

(21) Appl. No.: 16/125,677

(22) Filed: Sep. 8, 2018

(65) Prior Publication Data

US 2020/0023428 A1 Jan. 23, 2020

Related U.S. Application Data

(62) Division of application No. 14/670,566, filed on Mar. 27, 2015, now Pat. No. 10,099,275.
(60) Provisional application No. 61/976,020, filed on Apr. 7, 2014.

(51) Int. Cl.
| | |
|---|---|
| *B22C 9/10* | (2006.01) |
| *B22C 9/04* | (2006.01) |
| *B22C 21/14* | (2006.01) |
| *F01D 5/16* | (2006.01) |
| *B22C 9/24* | (2006.01) |

(52) U.S. Cl.
CPC ............... *B22C 9/10* (2013.01); *B22C 9/04* (2013.01); *B22C 9/103* (2013.01); *B22C 9/24* (2013.01); *B22C 21/14* (2013.01); *F01D 5/16* (2013.01); *F05D 2250/232* (2013.01); *Y02T 50/60* (2013.01); *Y10T 428/13* (2015.01)

(58) Field of Classification Search
CPC .. B22C 9/10; B22C 9/24; B22C 9/103; B22C 21/14; B22C 9/04; F01D 5/16; Y02T 50/671; F05D 2250/232; Y10T 428/13
USPC ...... 428/457, 137, 36.4, 408, 450, 586, 101, 428/113, 126, 134, 136, 138, 141, 174, 428/188, 195.1, 220, 223, 304.4, 332, 428/336, 343, 34.5, 35.2, 35.6, 35.8, 36.2, 428/402, 403, 410, 426, 43, 446, 472, 428/481, 513, 544, 548, 57, 600, 610, 428/613, 632, 633, 656, 670, 68, 69, 697, 428/698, 71, 76, 77
See application file for complete search history.

(56) References Cited

U.S. PATENT DOCUMENTS

| | | |
|---|---|---|
| 5,296,308 A | 3/1994 | Caccavale et al. |
| 6,626,230 B1 | 9/2003 | Woodrum et al. |
| 8,302,668 B1 | 11/2012 | Bullied et al. |

(Continued)

FOREIGN PATENT DOCUMENTS

| | | |
|---|---|---|
| EP | 2011970 A2 | 1/2009 |
| EP | 2471612 A1 | 7/2012 |
| GB | 2281238 A | 3/1995 |

OTHER PUBLICATIONS

Extended European Search Report for Application No. EP 15 16 2538 dated Aug. 17, 2015.

(Continued)

*Primary Examiner* — Gerard Higgins
*Assistant Examiner* — Kevin C. Ortman, Jr.
(74) *Attorney, Agent, or Firm* — Carlson, Gaskey & Olds, P.C.

(57) ABSTRACT

A component according to an exemplary aspect of the present disclosure includes, among other things, a first cavity, a second cavity and a rib between the first cavity and the second cavity, the rib including a first rib surface that is substantially flat and a second rib surface that is tapered.

15 Claims, 5 Drawing Sheets

(56) References Cited

U.S. PATENT DOCUMENTS

| | | |
|---|---|---|
| 9,132,476 B2 | 9/2015 | Lee et al. |
| 2002/0157251 A1 | 10/2002 | Esser et al. |
| 2013/0276460 A1 | 10/2013 | Propheter-Hinckley et al. |
| 2013/0323078 A1 | 12/2013 | Beattie et al. |
| 2013/0338267 A1 | 12/2013 | Appleby et al. |
| 2014/0072447 A1 | 3/2014 | Propheter-Hinckley |

OTHER PUBLICATIONS

Extended European Search Report for Application No. EP 16 16 5644 dated Jun. 27, 2016.
MW Def Tapered (Merriam-Webster, online dictionary, "Taper," p. 1-12, https://www.merriam-webster.com/dictionary/tapered, accessed Jan. 4, 2018).
MW Def Transverse (Merriam-Webster, online dictionary,"Transverse," p. 1-12, https://www.merriam-webster.com/dictionary/transverse, accessed Jan. 4, 2018).

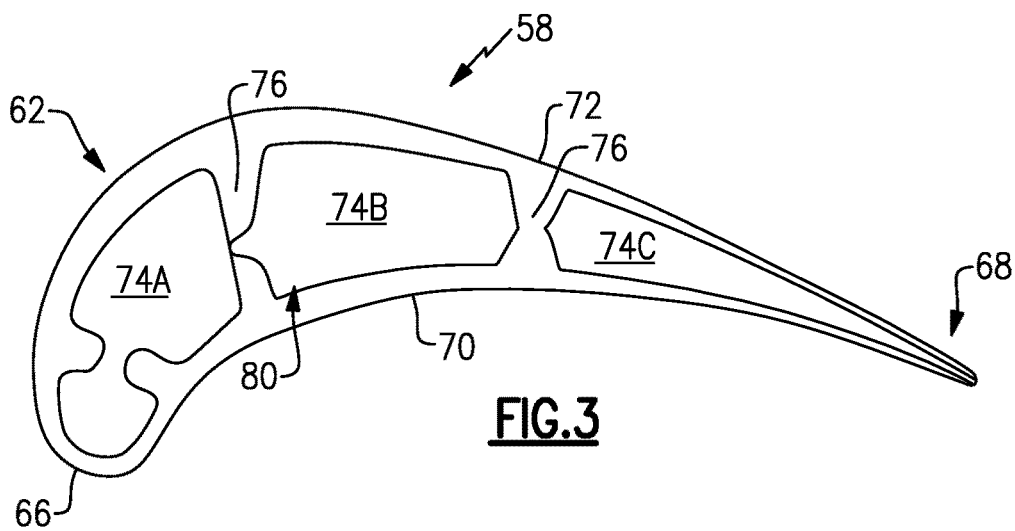
FIG.3
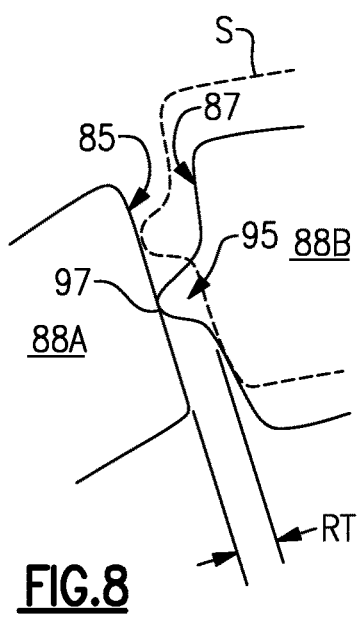
FIG.8
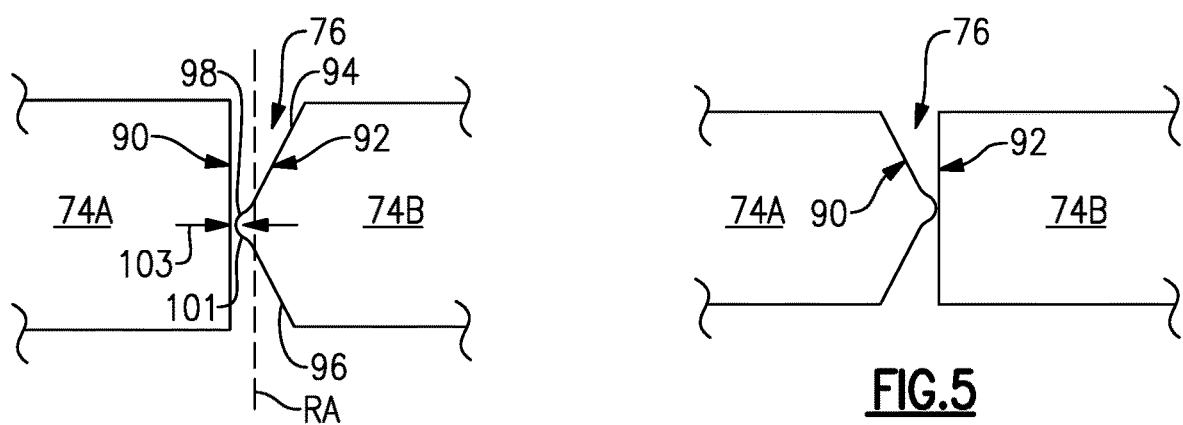
FIG.4
FIG.5

RIB BUMPER SYSTEM

CROSS REFERENCE TO RELATED APPLICATIONS

This application is a divisional of U.S. application Ser. No. 14/670,566, which was filed on Mar. 27, 2015, which claims priority to U.S. Provisional Application No. 61/976,020, which was filed on Apr. 7, 2014.

STATEMENT REGARDING FEDERALLY SPONSORED RESEARCH OR DEVELOPMENT

This invention was made with government support under Contract No. N00019-12-D-0002-4Y01, awarded by the United States Navy. The Government therefore has certain rights in this invention.

BACKGROUND

This disclosure relates to a gas turbine engine, and more particularly to a gas turbine engine component and a casting system for manufacturing the gas turbine engine component.

Gas turbine engines are widely used in aircraft propulsion, electric power generation, shift propulsion, and pumps. Many gas turbine engine components are cast. One example casting process is known as investment casting. Investment casting can form metallic parts having relatively complex geometries, such as gas turbine engine components requiring internal cooling passageways. Blades and vanes are two examples of such components.

The investment casting process typically utilizes a casting system that includes a mold having one or more mold cavities that define a shape generally corresponding to the part to be cast. A wax or ceramic pattern of the part is formed by molding wax or injecting ceramic material around a core assembly of the casting system. A shell is formed around the core assembly in a shelling process and then hardened to construct the casting system. Molten material is communicated into the casting system to cast a component. The shell and core assembly are removed once the molten material cools and solidifies.

Maintaining wall thicknesses to specification during the casting process can be difficult because of the relatively thin walled constructions of components that are cast to include relatively complex internal cooling passageways. For example, the spacing between the cores of a core assembly must be tightly controlled to produce parts having sufficient wall or rib thicknesses.

SUMMARY

A component according to an exemplary aspect of the present disclosure includes, among other things, a first cavity, a second cavity and a rib between the first cavity and the second cavity, the rib including a first rib surface that is substantially flat and a second rib surface that is tapered.

In a further non-limiting embodiment of the foregoing component, the component is one of a vane, a blade, a blade outer air seal, a panel, and a liner.

In a further non-limiting embodiment of either of the foregoing components, the first rib surface faces the first cavity and the second rib surface faces the second cavity.

In a further non-limiting embodiment of any of the foregoing components, the first rib surface faces the second cavity and the second rib surface faces the first cavity.

In a further non-limiting embodiment of any of the foregoing components, the first cavity is a leading edge cavity and the second cavity is a main body cavity.

In a further non-limiting embodiment of any of the foregoing components, the first cavity is a main body cavity and the second cavity is a trailing edge cavity.

In a further non-limiting embodiment of any of the foregoing components, an indentation extends from the second rib surface toward the first rib surface.

In a further non-limiting embodiment of any of the foregoing components, the second rib surface includes a first wall that is transverse to a second wall.

In a further non-limiting embodiment of any of the foregoing components, the first wall and the second wall converge at a central peak.

In a further non-limiting embodiment of any of the foregoing components, the first cavity and the second cavity are disposed inside of an airfoil of the component.

A core assembly for a casting system according to another exemplary aspect of the present disclosure includes, among other things, a first core that includes a first core surface that is substantially flat, a second core that includes a second core surface that is tapered, and a bumper that spaces the first core surface from the second core surface.

In a further non-limiting embodiment of the foregoing core assembly, the first core and the second core are ceramic cores.

In a further non-limiting embodiment of either of the foregoing core assemblies, the bumper extends from the second core surface toward the first core surface.

In a further non-limiting embodiment of any of the foregoing core assemblies, the bumper is configured to travel along the first core surface.

In a further non-limiting embodiment of any of the foregoing core assemblies, the second core surface includes a first wall that is transverse to a second wall, the first wall and the second wall meeting at a central peak.

In a further non-limiting embodiment of any of the foregoing core assemblies, the bumper straddles the central peak.

A casting system according to another exemplary aspect of the present disclosure includes, among other things, a core assembly that includes a first core and a second core, the first core including a first core surface that faces a second core surface of the second core. One of the first core surface and the second core surface is substantially flat and the other of the first core surface and the second core surface is tapered.

In a further non-limiting embodiment of the foregoing casting system, the core assembly includes a bumper that spaces the first core from the second core.

In a further non-limiting embodiment of either of the foregoing casting systems, the bumper extends from the one of the first core surface and the second core surface that is tapered.

In a further non-limiting embodiment of any of the foregoing casting systems, a nose of the bumper contacts the one of the first core surface and the second core surface that is substantially flat.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 3 is a cross-sectional view through section A-A of FIG. 2.

FIG. 4 illustrates a rib according to a first embodiment of a gas turbine engine component.

FIG. 5 illustrates a rib according to a second embodiment of a gas turbine engine component.

FIG. 8 illustrates a cross-sectional view through section C-C of FIG. 7.

DETAILED DESCRIPTION

This disclosure relates to a gas turbine engine component and a casting system for manufacturing the gas turbine engine component. The component includes a first cavity and a second cavity. A rib extends between the first and second cavities. The rib includes a first rib surface that is substantially flat and a second rib surface that is tapered. A casting system that can be used to form such a rib includes a first core having a substantially flat core surface, a second core having a tapered core surface, and a bumper that spaces the flat core surface from the tapered core surface. These and other features are discussed in greater detail herein.

Figure 1:
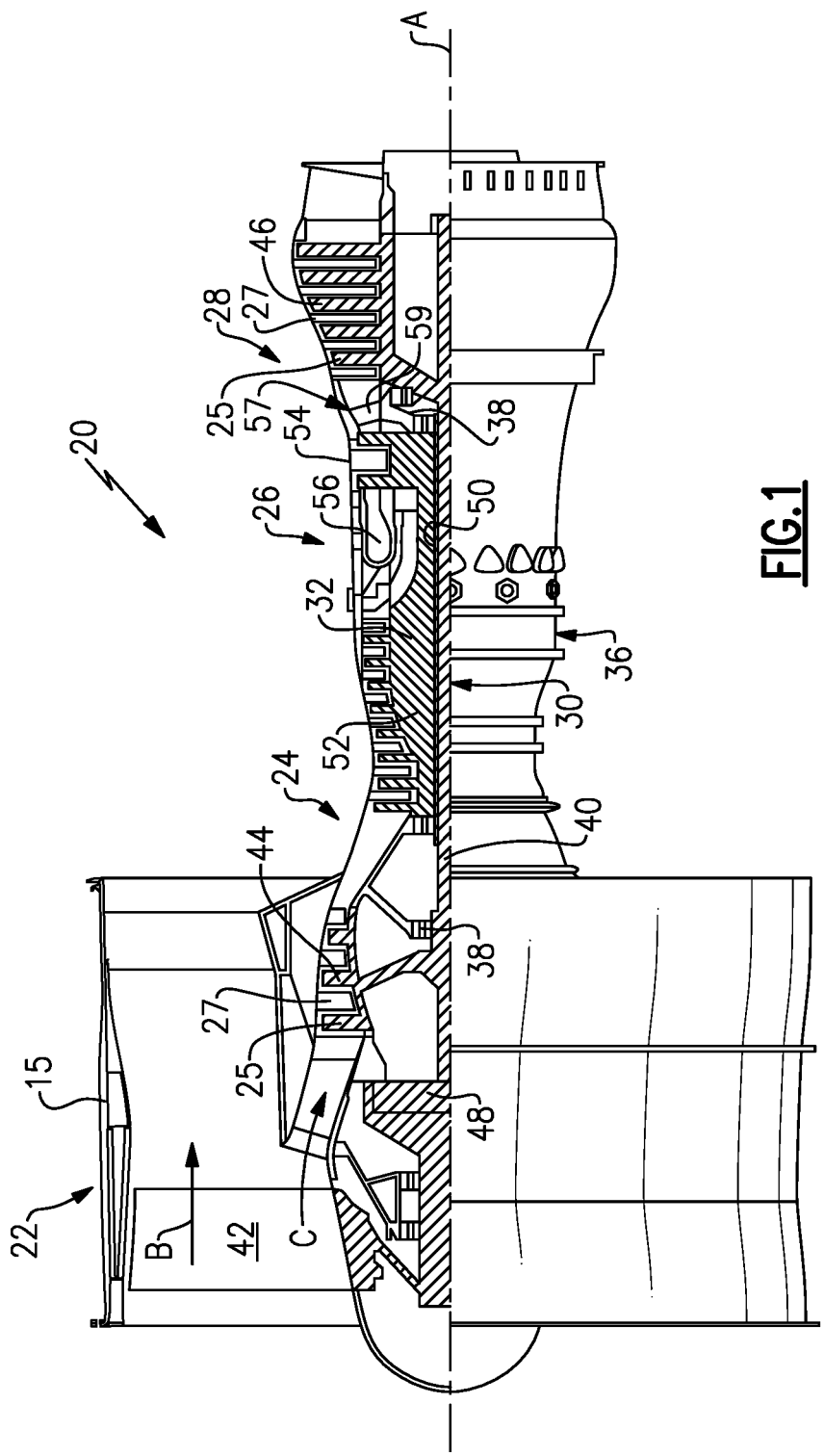
FIG. 1 illustrates a schematic, cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of the bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via the bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The gear system 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans and turboshafts.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft, with the engine at its best fuel consumption—also known as "bucket cruise Thrust Specific Fuel Consumption ("TSFC")"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1,150 ft/second (350.5 meters/second).

Each of the compressor section 24 and the turbine section 28 may include alternating rows of rotor assemblies and vane assemblies (shown schematically). For example, the rotor assemblies can carry a plurality of rotating blades 25, while each vane assembly can carry a plurality of vanes 27 that extend into the core flow path C. The blades 25 may either create or extract energy in the form of pressure from the core airflow as it is communicated along the core flow path C. The vanes 27 direct the core airflow to the blades 25 to either add or extract energy.

Figure 2:
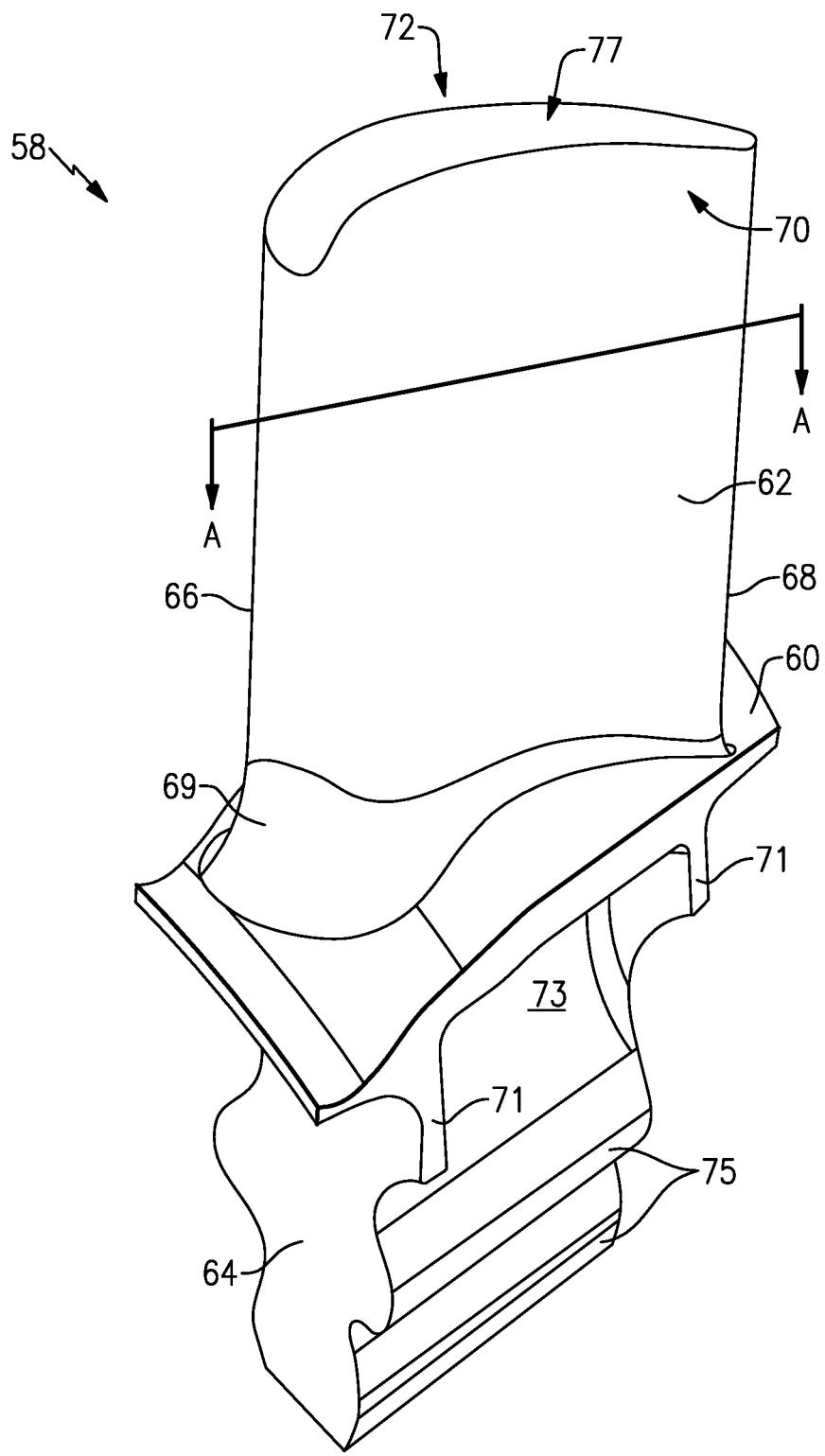
FIG. 2 illustrates a gas turbine engine component.

FIGS. 2 and 3 illustrate a component 58 that can be cast in a casting process, such as an investment casting process. In one embodiment, the component 58 is a turbine blade. Although the component 58 is illustrated as turbine blade, the various features of this disclosure are applicable to any cast part, including parts located elsewhere within a gas turbine engine, such as vanes, blade outer air seals, combustor panels, etc. Thus, some features that are particularly relevant to the illustrated turbine blade are to be considered optional and are not necessary to practice this disclosure.

In one embodiment, the component 58 includes a platform 60, an airfoil 62 that extends in a first direction from the platform 60, and a root 64 that extends in a second, opposite direction from the platform 60. The airfoil 62 includes a leading edge 66, a trailing edge 68, a pressure side 70 and a suction side 72. The pressure side 70 and the suction side 72 are spaced apart and generally meet together at both the leading edge 66 and the trailing edge 68.

The airfoil 62 connects to the platform 60 at a fillet 69. The root 64 connects to the platform 60 at buttresses 71. The root 64 may include a neck 73 and one or more serrations 75 for securing the component 58 to a disk (not shown).

With reference to the engine 20 of FIG. 1, the airfoil 62 extends to a tip 77, which can be referred to as an outer diameter portion of the component 58. The root 64 can be referred to as the inner diameter portion of the component 58.

Referring to FIG. 3, the component 58 can include multiple internal cooling cavities 74A, 74B and 74C that are separated by ribs 76. The internal cooling cavities 74A, 74B and 74C are core formed cavities that extend inside of the airfoil 62. The internal cooling cavities 74A, 74B and 74C may form part of an internal circuitry 80 for cooling the component 58. The exemplary internal circuitry 80 of the component 58 represents but one non-limiting example of the many potential cooling circuits that may be formed inside the component 58. In other words, the component 58 could be cast to include various alternative cooling cavities and internal circuitry configurations within the scope of this disclosure.

FIG. 4 illustrates an exemplary rib 76 that can be incorporated into a component 58. In one embodiment, the rib 76 extends between a first cavity 74A and a second cavity 74B that are disposed inside of the component 58. The first cavity 74A and the second cavity 74B may be any type of cavity and are not limited to cooling cavities. For example, the cavities 74A, 74B could be weight reduction cavities. The cavities 74A, 74B could also be a leading edge cavity, a main body cavity, a trailing edge cavity, etc. In one non-limiting embodiment, the first cavity 74A is a leading edge cavity and the second cavity 74B is a main body cavity. In another embodiment, the first cavity 74B is a main body cavity and the second cavity 74B is a trailing edge cavity.

The rib 76 may include a first rib surface 90 that faces toward the first cavity 74A, and a second rib surface 92 that faces toward the second cavity 74B. In one non-limiting embodiment, the first rib surface 90 is flat and the second rib surface 92 is tapered. For example, the first rib surface 90 may extend in parallel with a rib axis RA that extends through the rib 76. The term "flat" as used in this disclosure is intended to denote a surface that is substantially flat. In other words, a surface may include some relatively small uneven areas and still be considered flat.

The second rib surface 92 may include a first wall 94 and a second wall 96 that is transverse to the first wall 94. The first wall 94 and second wall 96 may converge at a central peak 98 and are transverse, or non-parallel, to the rib axis RA.

The rib 76 may additionally include an indentation 101 that extends from the first rib surface 90 toward the second rib surface 92. The indentation 101 defines a minimum neck area 103 of the rib 76.

FIG. 5 illustrates an opposite configuration to the one shown in FIG. 4. In this embodiment, the first rib surface 90 is a tapered surface that faces toward the first cavity 74A and the second rib surface 92 is a flat surface that faces toward the second cavity 74B. In other words, either side of the rib 76 may include the flat surface.

Figure 6:
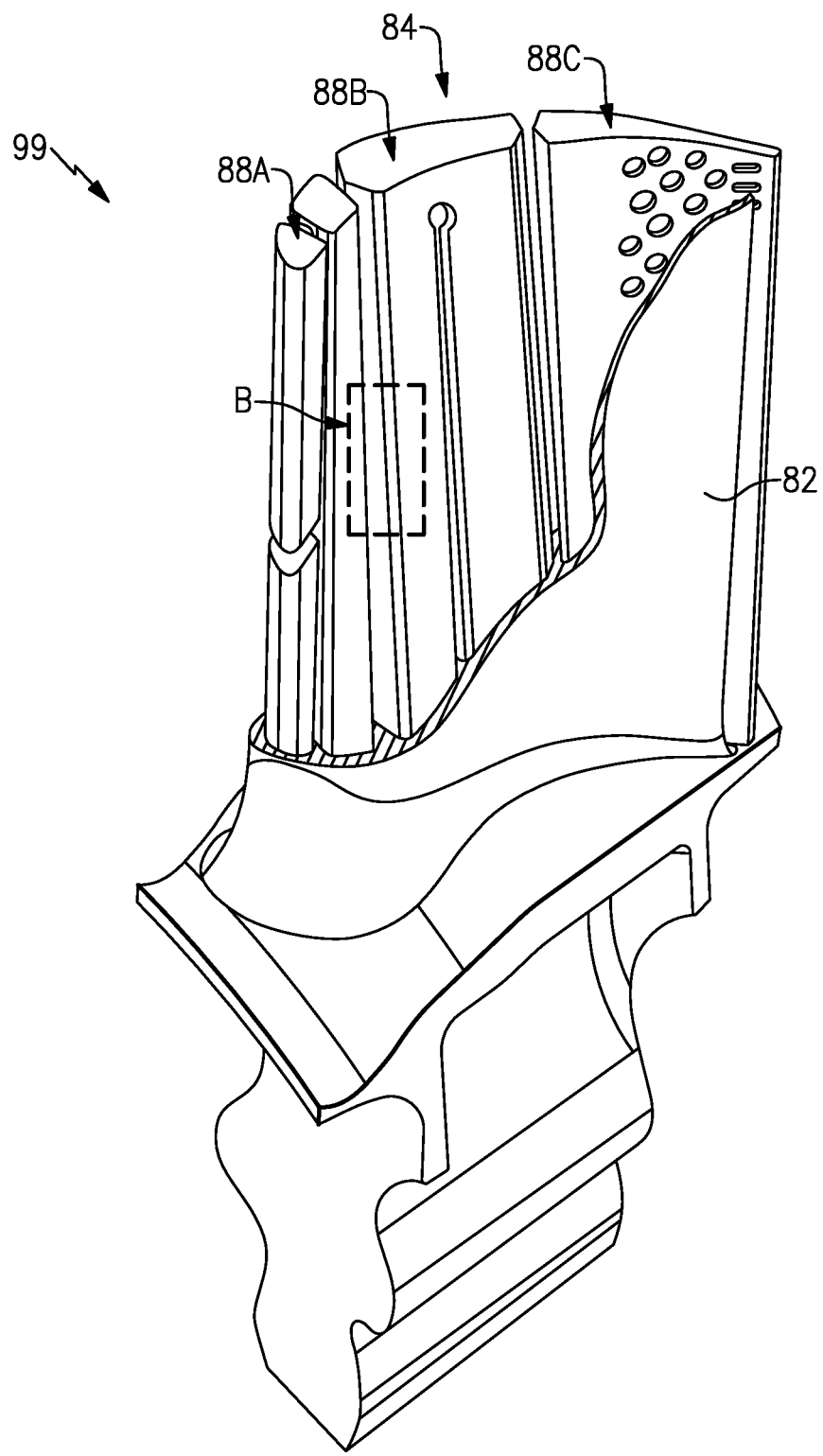
FIG. 6 illustrates a casting system.

FIG. 6 illustrates a casting system 99 that can be used to manufacture the component 58 described above, or some other gas turbine engine component. The casting system 99 includes a core assembly 84 made up of one or more cores 88. In one embodiment, the cores 88 are ceramic cores. However, other core materials are also contemplated as within the scope of this disclosure.

In one non-limiting embodiment, the core assembly 84 includes a first core 88A, which is a leading edge core, a second core 88B, which is a main body core, and a third core 88C, which is a trailing edge core. A wax pattern 82 generally surrounds the core assembly 84. Once removed from the component 58 post cast, such via a leeching operation, the core assembly 84 forms the internal cavities 74A, 74B and 74C of the component 58, and the cast metal replaces the wax pattern 82 to form the outer body of the component 58. An area B of the core assembly 84 is denoted in FIG. 6 and highlights a location between the first core 88A and the second core 88B.

Figure 7:
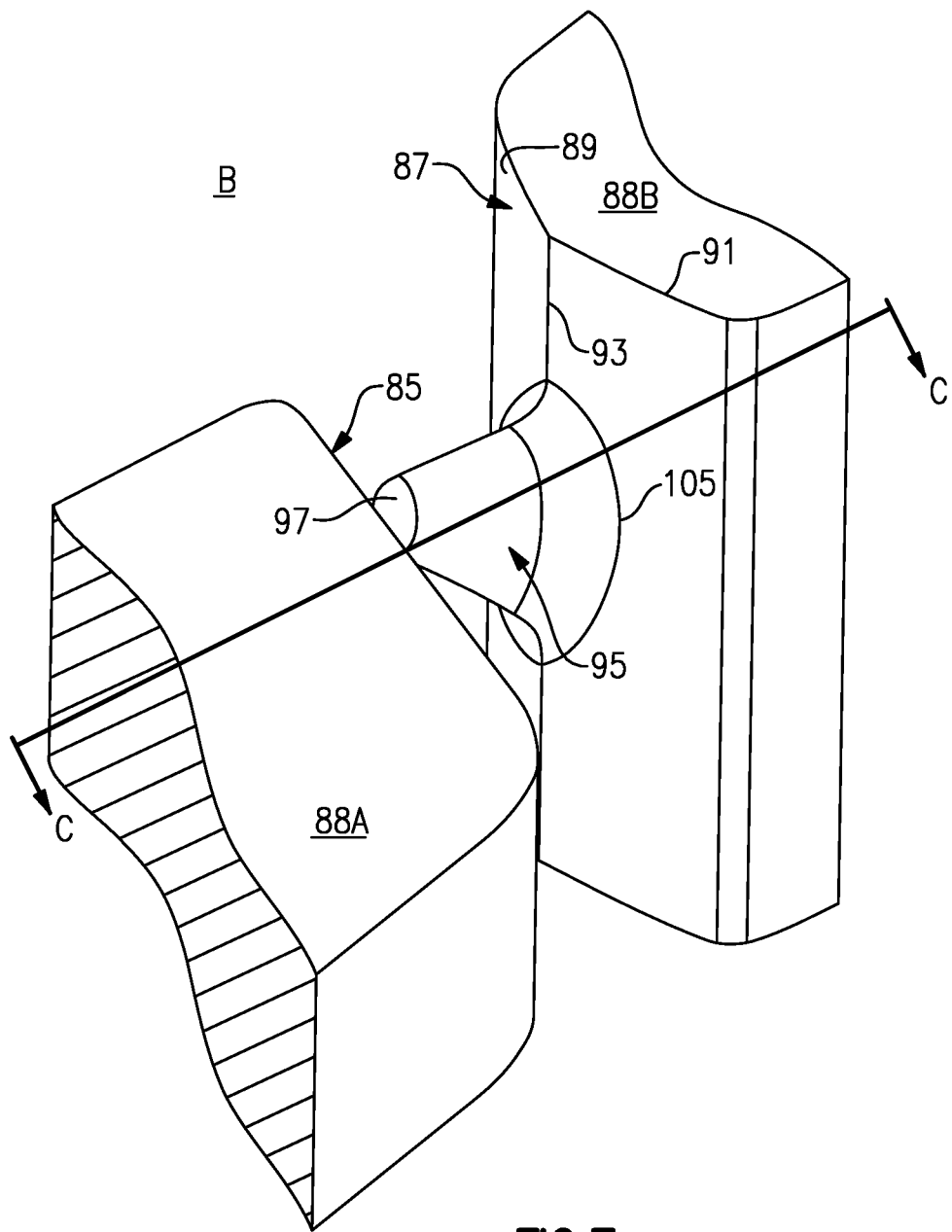
FIG. 7 illustrates a view of area B of the casting system of FIG. 6.

FIG. 7 illustrates the area B of the core assembly 84 of FIG. 6. In this embodiment, the relationship between the first core 88A and the second core 88B is illustrated. However, the features of this disclosure could extend to any core, and this disclosure is not limited to leading edge and main body cores.

In one embodiment, the first core 88A includes a first core surface 85 that is flat, and the second core 88B includes a second core surface 87 that is tapered. The second core surface 87 may include a first wall 89 that is transverse to a second wall 91. The first wall 89 and the second wall 91 may converge at a central peak 93.

In one embodiment, a bumper 95 spaces the first core 88A from the second core 88B. The bumper 95 may extend from the second core surface 87 toward first core surface 85. A base 105 of the bumper 95 may straddle the central peak 93 of the second core surface 87.

Referring now to FIG. 7 and FIG. 8, a nose 97 of the bumper 95 may be contiguous with or contact the first core surface 85. In one non-limiting embodiment, the nose 97 of the bumper 95 is configured to travel along the flat first core surface 85 during a casting process.

For example, an exemplary shift of the second core 88B relative to the first core 88A is illustrated in phantom lines S in FIG. 8. During any such shift, the nose 97 of the bumper 95 rides along the flat, first core surface 85 such that a minimum rib thickness RT is maintained during the casting process.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A core assembly for a casting system, comprising:
    a leading edge core for forming a leading edge cavity in an airfoil and including a first core surface that is substantially flat;
    a second core that includes a second core surface that is tapered; and
    a bumper that spaces said first core surface from said second core surface, wherein said bumper includes a base and a nose, said base straddles a central peak formed by said second core surface, and said nose is movable along the first core surface during a casting process.

2. The core assembly as recited in claim 1, wherein said leading edge core and said second core are ceramic cores.

3. The core assembly as recited in claim 1, wherein said bumper extends from said second core surface toward said first core surface.

4. A core assembly for a casting system, comprising:
    a leading edge core for forming a leading edge cavity in an airfoil and including a first core surface that is substantially flat;
    a second core that includes a first wall that is transverse to a second wall; and
    a bumper that spaces said first core surface from said second core surface, wherein said bumper includes a base and a nose, said base straddles a central peak formed by said first wall and said second wall, and said nose is movable along the first core surface during a casting process.

5. The core assembly as recited in claim 4, wherein said bumper extends from said second core toward said first core surface.

6. The core assembly as recited in claim 4, wherein said leading edge core and said second core are ceramic cores.

7. A core assembly for a casting system, comprising:
    a leading edge core for forming a leading edge cavity in an airfoil and including a first core surface that is substantially flat;
    a second core that includes a first wall that is transverse to a second wall, said first wall and said second wall meeting at a central peak; and
    a bumper that spaces said first core surface from said second core surface, wherein said bumper includes a base and a nose, and said base straddles a central peak formed by said first wall and said second wall, wherein said nose is movable along said first core surface during a casting process.

8. The core assembly as recited in claim 4, wherein said second core is a main body core configured for forming a main body cavity in an airfoil.

9. The core assembly as recited in claim 8, wherein said bumper is configured to maintain a minimum thickness of a rib separating said leading edge cavity from said main body cavity.

10. The core assembly as recited in claim 7, wherein said second core is a main body core configured for forming a main body cavity in an airfoil.

11. The core assembly as recited in claim 10, wherein said bumper is configured to maintain a minimum thickness of a rib separating said leading edge cavity from said main body cavity.

12. The core assembly as recited in claim 7, wherein said leading edge core and said second core are ceramic cores.

13. The core assembly as recited in claim 1, wherein said second core is configured to form a second cavity in an airfoil, and said bumper is configured to maintain a minimum thickness of a rib separating said leading edge cavity from said second cavity.

14. The core assembly as recited in claim 4, wherein said second core is configured to form a second cavity in an airfoil, and said bumper is configured to maintain a minimum thickness of a rib separating said leading edge cavity from said second cavity.

15. The core assembly as recited in claim 7, wherein said second core is configured to form a second cavity in an airfoil, and said bumper is configured to maintain a minimum thickness of a rib separating said leading edge cavity from said second cavity.

* * * * *